(12) United States Patent
Brutaru

(10) Patent No.: US 11,542,759 B2
(45) Date of Patent: Jan. 3, 2023

(54) SUPPORT GATE DEVICE FOR A DIRECTIONAL DRILLING MACHINE

(71) Applicant: Viorel Gabriel Brutaru, Pompano Beach, FL (US)

(72) Inventor: Viorel Gabriel Brutaru, Pompano Beach, FL (US)

( * ) Notice: Subject to any disclaimer, the term of this patent is extended or adjusted under 35 U.S.C. 154(b) by 329 days.

(21) Appl. No.: 17/023,704

(22) Filed: Sep. 17, 2020

(65) Prior Publication Data

US 2022/0081979 A1   Mar. 17, 2022

(51) Int. Cl.
*E21B 19/14* (2006.01)
*F16M 13/02* (2006.01)
*E21B 7/04* (2006.01)
*B65G 57/06* (2006.01)

(52) U.S. Cl.
CPC .............. *E21B 19/14* (2013.01); *B65G 57/06* (2013.01); *E21B 7/046* (2013.01); *F16M 13/02* (2013.01)

(58) Field of Classification Search
CPC ......... B65G 57/06; E21B 19/14; E21B 19/15; E21B 19/155; E21B 19/20; E21B 7/04
See application file for complete search history.

(56) References Cited

U.S. PATENT DOCUMENTS 10,808,466 B2 * 10/2020 Porter .................... E21B 19/20
2014/0209382 A1 * 7/2014 Smith .................... E21B 19/14
                                                                        175/24

* cited by examiner

*Primary Examiner* — Lynn E Schwenning
(74) *Attorney, Agent, or Firm* — Ruben Alcoba, Esq.

(57) ABSTRACT

A support gate device that allows iron tubes to be loaded efficiently into a pipe holding bin of a directional drilling machine. The support gate device is a rectangular cartridge the houses a swiveling gate. The swiveling gate has a stop plate and a spring. The support gate device attaches to an end of a horizontal bar of the directional drilling machine. The directional drilling machine has a pair of horizontal bars that are linearly opposed to each other that lead into the pipe holding bin. A pair of support gate devices are installed on the horizontal bars of the directional drilling machine.

1 Claim, 5 Drawing Sheets

# SUPPORT GATE DEVICE FOR A DIRECTIONAL DRILLING MACHINE

BACKGROUND

The present invention is directed to a support gate device for a directional drilling machine that allows iron tubes to be loaded efficiently into a pipe holding bin of the directional drilling machine.

Horizontal Directional Drilling, is a minimal impact trenchless method of installing underground pipe, conduit, or cables in a relatively shallow arc or radius along a prescribed underground bore path by using a surface-launched drilling rig.

Directional drilling machines, such as the DITCH WITCH®, are used to accomplish horizontal directional drilling.

Directional drilling machines use drilling stems that are connected to each other by directional drilling machines and drilling heads that are attached to the end of the drilling stems boring the path wherein conduit will be laid. Drilling stems have male and female fasteners that are attached to each other and directional drilling machines can store up to 150 meters in drilling stems in directional drilling machine holding bins. The drilling stems are made of metal and are heavy in nature.

After bored paths have been created by the directional drilling machines, the drilling stems are collected and housed within the bins of the directional drilling machines (hereinafter DDMs. The DDMs collect the drilling stems and separate each stem prior to housing them within their bins. To house within their bins, the DDMs use hydraulic bar/stem lifts to lift the stems drilling within the bins. Typically, there will be at least two hydraulic bar lifts, separated an equal distance from a central portion of the bin, that will receive each separated drilling stem and lift each stem within the bin. Each hydraulic bar lift uses a concave head that is attached to a rod that goes up and down to push each drilling stem within the bin.

The present invention is a support gate device for a directional drilling machine that increases the efficiency and life of a directional drilling machine. It increases the efficiency by minimizing the resistance placed on the hydraulic bar lifts when the hydraulic bar lifts raise pipes into the loading bin of a directional drilling machine. By minimizing the resistance placed on the hydraulic bar lifts, the life of the rods of the hydraulic bar lift are maximized. When the resistance is not minimized, the rod of the hydraulic bar lift may skew from the linear direction when the weight of the bars within the loading bin increases or when a drilling stem does not rest correctly upon the concave portion of the head of the hydraulic bar lift when storing the bars within the loading bin. When the rods of the hydraulic bar lift skew past a certain point they tend to break and thereby make the directional drilling machine inoperable.

The support gate device of the present invention is needed to increase the efficiency and life of a directional drilling machine.

SUMMARY

The present invention describes a support gate device that increases the efficiency and life of a directional drilling machine by minimizing the weight placed on the hydraulic bar lifts of the directional drilling machines when the hydraulic bar lifts lift pipes into the pipe holding bin of the directional drilling machine.

The support gate device of the present invention allows iron tubes to be loaded efficiently into a pipe holding bin of a directional drilling machine. The support gate device is a rectangular cartridge the houses a swiveling gate. The swiveling gate has a stop plate and a spring. The support gate device attaches to a horizontal bar of the directional drilling machine. The directional drilling machine has a pair of horizontal bars that are linearly opposed to each other that lead into the pipe holding bin. A pair of support gate devices are installed on the horizontal bars of the directional drilling machine. The support gate device has a locked and a released position. When the support gate device is in the released position, the hydraulic bar lifts of the directional drilling machines can lift bars within the pipe holding bin of the directional drilling machine. When the support gate is in the locked position, the hydraulic bar lifts of the directional drilling machine can lower bars from the pipe holding bin.

An object of the present invention is to provide a support gate device that will improve the efficiency of a directional drilling machine.

Another object of the present invention is to provide a support gate device that will increase the life of a directional drilling machine.

DRAWINGS

These and other features, aspects, and advantages of the present invention will become better understood with regards to the following description, appended claims, and drawings where:

Figure 1:
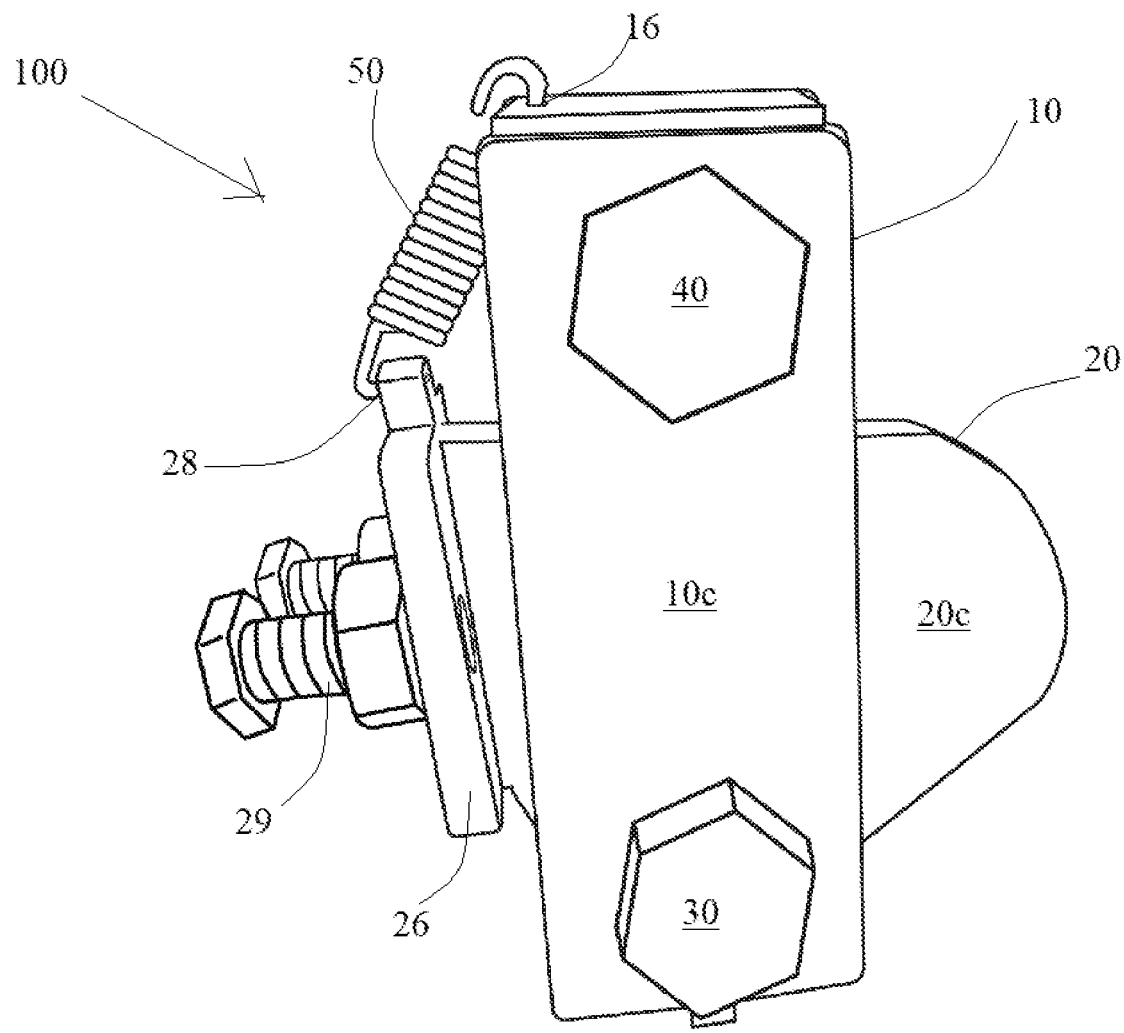
FIG. 1 is a left side view of the present invention.
Figure 2:
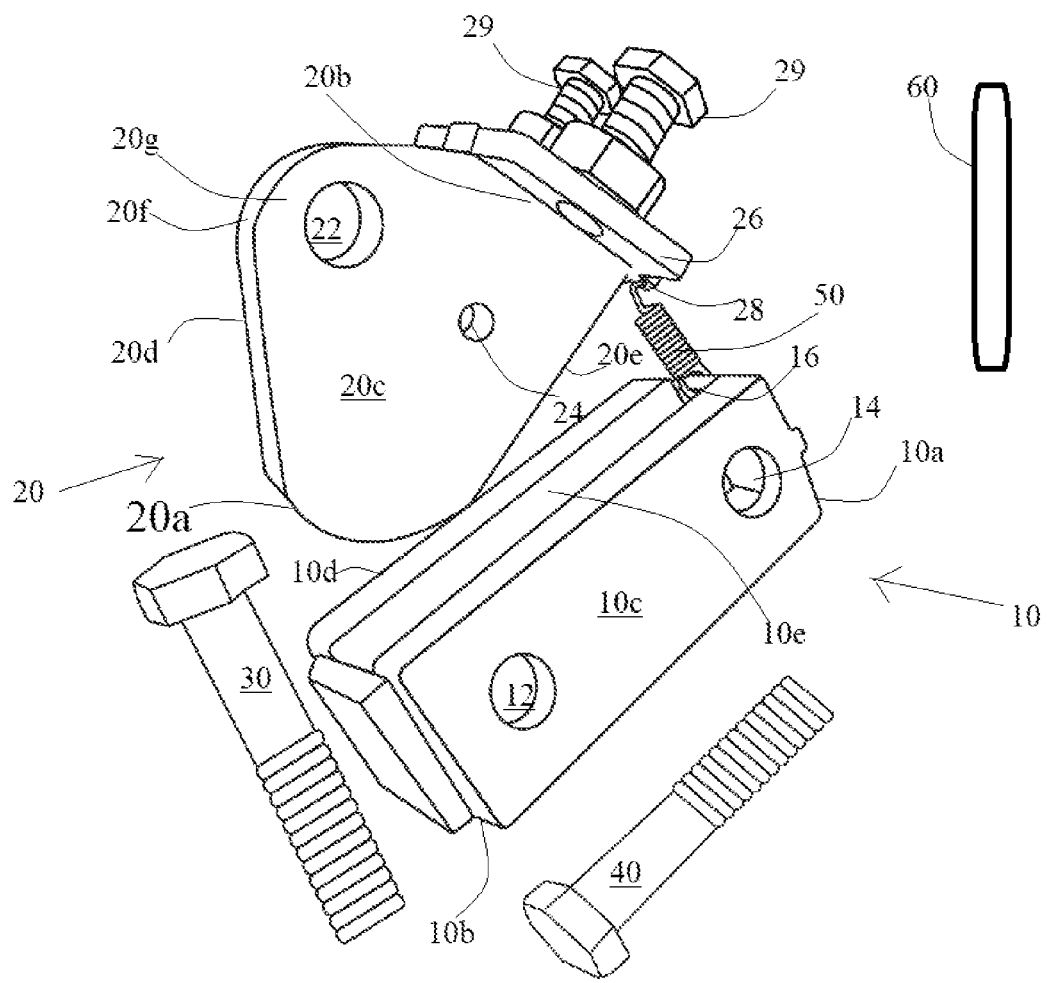
FIG. 2 is a perspective view of the present invention that highlights the individual parts of the present invention.
Figure 4:
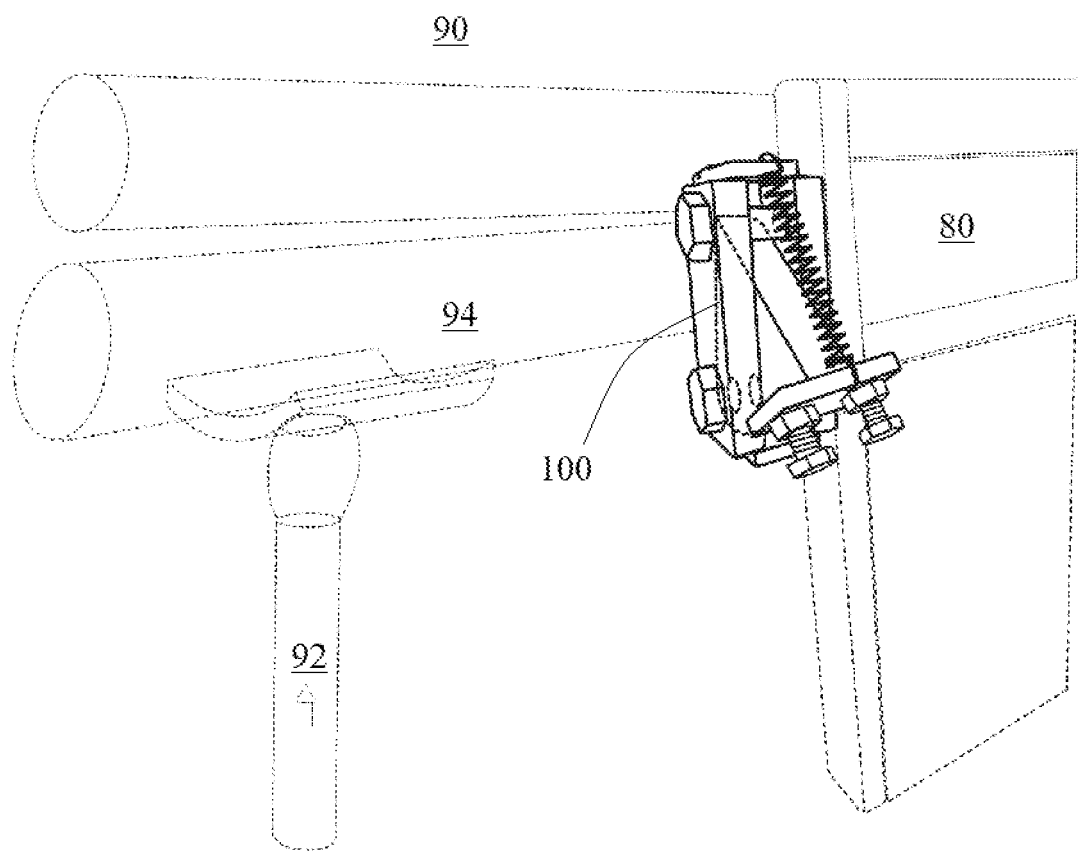
Figure 5:
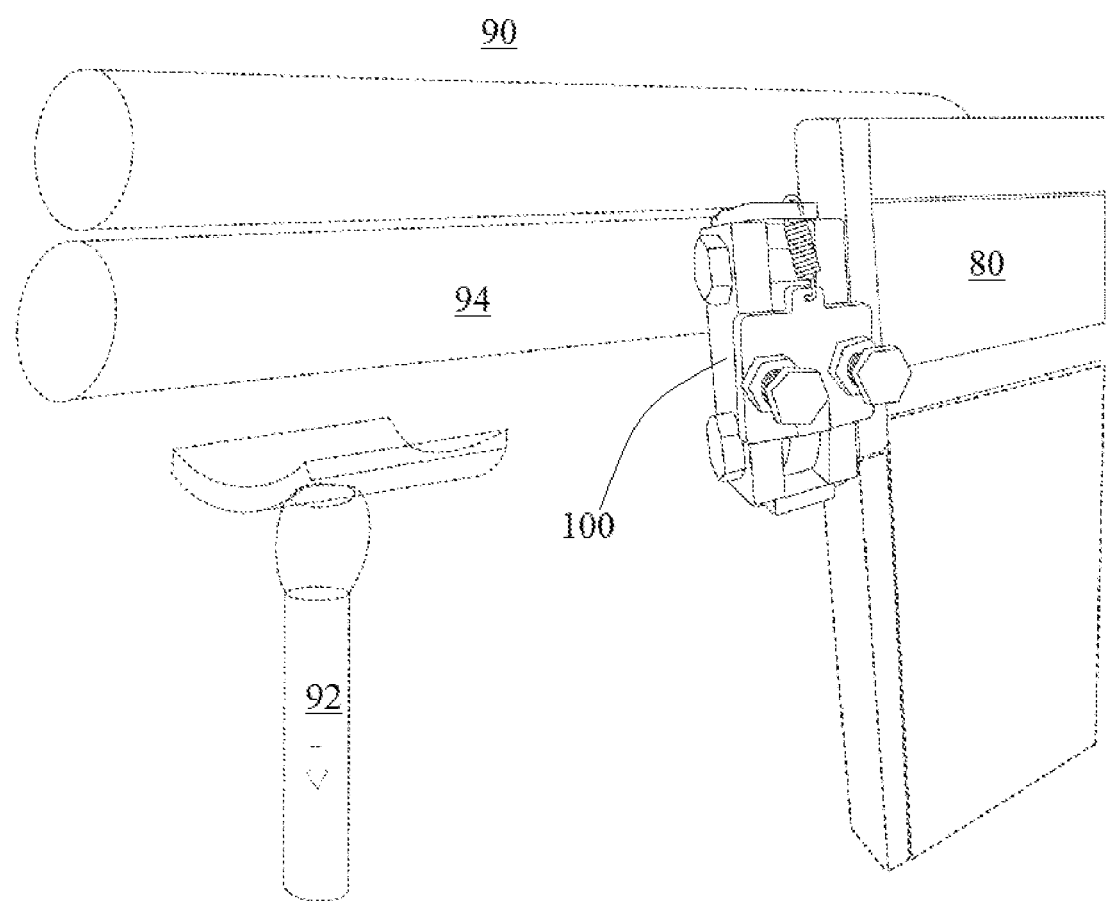

FIG. 4 is a perspective view of the present invention when it is mounted on a horizontal bar of a directional drilling machine, the view shows the hydraulic bar lift lifting a bar upward, the bar is passing the gate of the present invention; and FIG. 5 is a perspective view of the present invention when it is mounted on a horizontal bar of a directional drilling machine, the view shows a hydraulic bar lift that is going in a downward direction, the present invention is in the rest or normal state position, and the bar that was lifted in FIG. 2 is shown resting on the top side of the gate of the present invention.

DESCRIPTION

As seen in FIGS. 1-5, the present invention describes a support gate device 100 that allows iron tubes to be loaded efficiently into a holding bin 90 of a directional drilling machine. The support gate device 100 comprises of a rectangular cartridge 10 that has a top side 10a, a bottom side 10b, a left side 10c and a right side 10d, the top side 10a and the bottom side 10b are parallel to each other and the left side 10c and the right side 10d are parallel to each other, the rectangular cartridge 10 defines an empty space 10e between the left side 10c and the right side 10d, both the left side 10c and the right side 10d of the rectangular cartridge 10 define a lower through hole 12 and an upper through hole 14, the lower though holes 12 are parallel to each other and the upper through holes 14 are parallel to each other, and the top side 10a of the rectangular cartridge defines 10 a rear through hole 16. A gate 20 that has a front side 20a, a rear side 20b, a left side 20c, a right side 20d, a top side 20e and a hinge side 20f, the hinge side 20f is v-shaped, the front side 20a is curved shaped, the top side 20e is linear and the rears side 20b is linear, the left side 20c and right side 20d are a set of planes that are parallel to each other and they define a hinge through hole 22 that is adjacent to an apex 20g of the hinge side 20f of the gate 20 and the left side 20c and the right side 20d of the gate 20 also define a pin through hole 24 that runs at a perpendicular position from the top side 20e of the gate 20 and that is linearly aligned between the top side 20e of the gate 20 and the hinge through hole 22, a stop plate 26 is attached to the rear side 20b of the gate 20 and the stop plate 26 defines a spring through hole 28 that is at a position that is aligned with the top side 20e of the gate 20, the stop plate 26 defines at least one gate grip 29. A hinge screw 30 that inserts through the lower through holes 12 of the left side 10c and right side 10d of the rectangular cartridge 10 and the hinge through hole 22 of the gate 20 after the hinge gate through hole 22 is lined up with the lower through holes 12 of the rectangular cartridge 10, the hinge screw 30 attaches to a horizontal bar 80 of the holding bin 90. A securing screw 40 that inserts through the upper through holes 14 of the left side 10c and right side 10d of the rectangular cartridge 10 that attaches to the horizontal bar 80 of the holding bin 90. A spring 50 that is attached to the rear through hole 16 of the rectangular cartridge 10 and to the spring through hole 28. And, a lock pin 60 that inserts in the pin through hole 24 of the gate 20 when the directional drilling machine is not loading at least one pipe in the holding bin 90 of a directional drilling machine.

In preferred embodiments, the support gate device 100 is made of a material that is either iron, steel or stainless steel.

Figure 3:
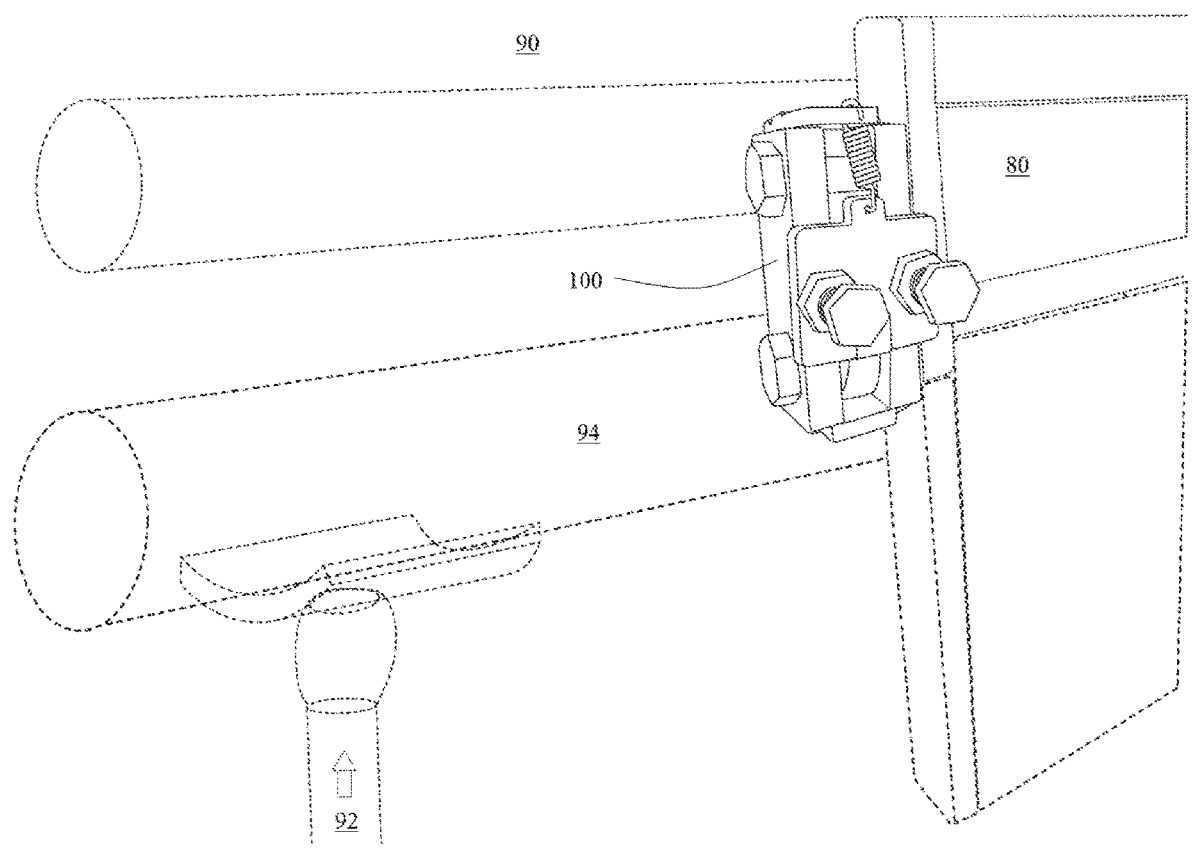
FIG. 3 is a perspective view of the present invention when it is mounted on a horizontal bar of a directional drilling machine, the view shows a hydraulic bar lift lifting a bar upward, yet not passing the gate of the present invention.

As seen in FIGS. 3-5, when the directional drilling machine is loading pipes into its bin 90, the lock pin 60 is removed from the pin though hole 24 of the support gate device 100.

The support gate device 100 works by reducing the downward pressure that is gravitationally exerted by the pipes within the pipe holding bin on the pipes being loaded into the pipe holding bin. When the pipes are not being loaded, the gate 20 is at a rest position that supports bars resting on its top side 20e. When pipes are loaded into the bin 90, the gate 20 is pivoted upward by a pipe being pushed upward by a hydraulic lift 92 until a certain point is reached, when the certain point is reached and the gate 20 is no longer in contact with the pipe 94, the gate 20 releases to the rest position, after the gate is released to the rest position, the hydraulic lift moves downward until the pipe falls on to the top side of the gate 20 or into the bin 90.

When the directional drilling machine unloads pipes, the lock pin is inserted within the pin through hole so that the pipes can freely pass downward from the bin when the hydraulic lift lowers the pipes for attachment. To insert the lock pin 60, the at least one gate grip 29 is pulled and the lock pin 60 is inserted into the pin through hole 24.

In a preferred embodiment of the present invention, the directional drilling machine is a DITCH WITCH®.

An advantage of the present invention is that it provides a support gate device that improves the efficiency of a directional drilling machine.

Another advantage of the present invention is that it provides a support gate device that increases the life of a directional drilling machine.

While the inventor's above description contains many specificities, these should not be construed as limitations on the scope, but rather as an exemplification of several preferred embodiments thereof. Accordingly, the scope should not be determined by the embodiments illustrated, but by the appended claims and their legal equivalents.

What is claimed is:

1. A support gate device that allows iron tubes to be loaded into a holding bin of a directional drilling machine, the support gate device comprises:
   a rectangular cartridge that has a top side, a bottom side, a left side and a right side, the top side and the bottom side are parallel to each other and the left side and the right side are parallel to each other, the rectangular cartridge defines an empty space between the left side and the right side, both the left side and the right side of the rectangular cartridge define a lower through hole and an upper through hole, the lower though holes are parallel to each other and the upper through holes are parallel to each other, and the top side of the rectangular cartridge defines a rear through hole;
   a gate that has a front side, a rear side, a left side, a right side, a top side and a hinge side, the hinge side is v-shaped, the front side is curved shaped, the top side is linear and the rears side is linear, the left side and right side are a set of planes that are parallel to each other and they define a hinge through hole that is adjacent to an apex of the hinge side of the gate and the left side and the right side of the gate also define a pin through hole that runs at a perpendicular position from the top side of the gate and that is linearly aligned between the top side of the gate and the hinge through hole, a stop plate is attached to the rear side of the gate and the stop plate defines a spring through hole that is at a position that is aligned with the top side of the gate, the stop plate defines at least one gate grip;
   a hinge screw that inserts through the lower through holes of the left side and right side of the rectangular cartridge and the hinge through hole of the gate after the hinge gate through hole is lined up with the lower through holes of the rectangular cartridge, the hinge screw attaches to a horizontal bar of the holding bin;
   a securing screw that inserts through the upper through holes of the left side and right side of the rectangular cartridge that attaches to the horizontal bar of the holding bin;
   a spring that attaches to the rear through hole of the cartridge and to the spring through hole; and
   a lock pin that inserts in the pin through hole of the gate when the directional drilling machine is not loading at least one pipe in the holding bin of a directional drilling machine.

* * * * *